No. 854,134. PATENTED MAY 21, 1907.
R. WHITAKER.
VALVE.
APPLICATION FILED DEC. 28, 1905.

Witnesses:
Jas. F. Coleman
John S. Lobel

Inventor
Richard Whitaker
By Dyer & Dyer
Attorneys

UNITED STATES PATENT OFFICE.

RICHARD WHITAKER, OF NEW BRUNSWICK, NEW JERSEY, ASSIGNOR, BY DIRECT AND MESNE ASSIGNMENTS TO BRUNSWICK REFRIGERATING COMPANY, A CORPORATION OF NEW JERSEY.

VALVE.

No. 854,134.   Specification of Letters Patent.   Patented May 21, 1907.

Application filed December 28, 1905. Serial No. 293,553.

*To all whom it may concern:*

Be it known that I, RICHARD WHITAKER, a citizen of the United States, residing in the city of New Brunswick, county of Middlesex, and State of New Jersey, have invented a certain new and useful Improvement in Valves, of which the following is a description.

The object I have in view is the production of a valve which will be particularly applicable to ammonia refrigerating apparatus of the compression type, and is particularly adapted to be used as the expansion valve thereof, although it may be useful in other situations.

A further object is to produce a valve which will be cheap to manufacture, and which may be readily ground.

Other objects will more fully appear in the following specification and accompanying drawings.

Figure 1:
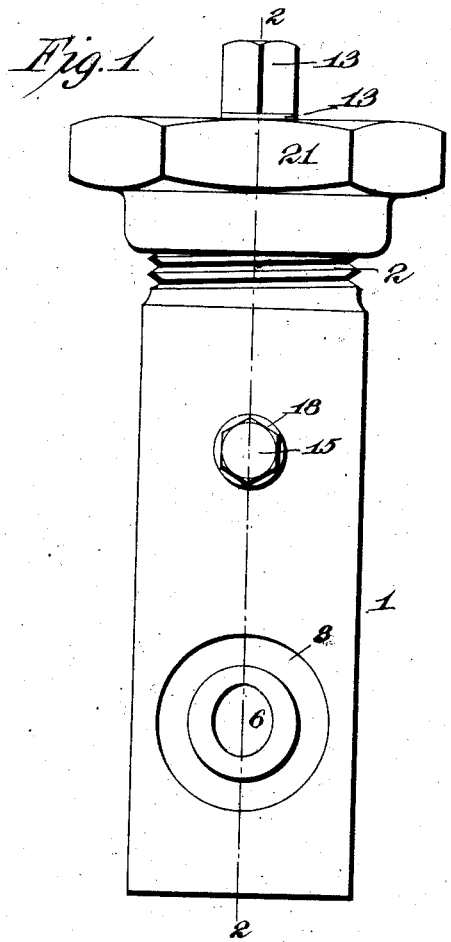
Figure 2:
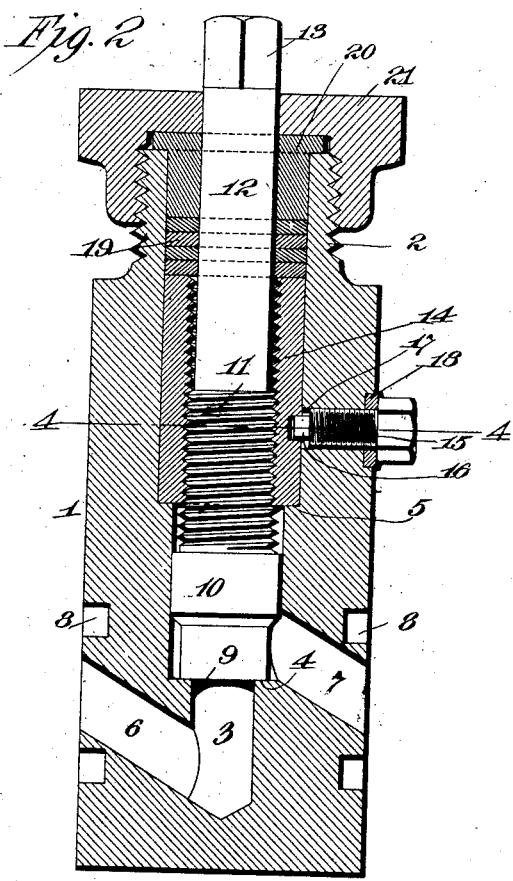
Figure 3:
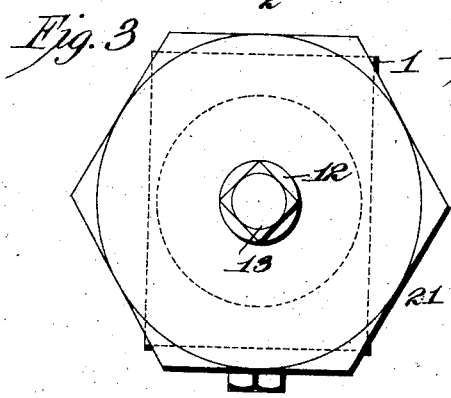
Figure 4:
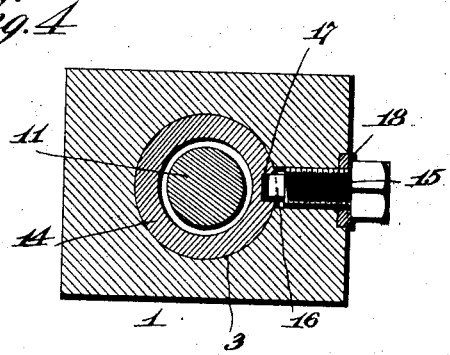

In the drawings Figure 1 represents a side elevation of a valve embodying my invention. Fig. 2 is a sectional view thereof taken on the lines 2—2 of Fig. 1. Fig. 3 is a top view of the valve shown in Fig. 1; and Fig. 4 is a transverse section taken on the lines 4—4 of Fig. 2.

In all of the several views like parts are designated by the same reference characters.

In carrying out my invention I provide a body 1. This body is preferably of the rectangular cross section shown and is best made of machinery steel, which is advantageous in connection with refrigerating apparatus in that there are no blow holes or other flaws common to cast metal. The body is provided with an extended neck 2, which is preferably screw threaded as shown. Through the center of the body passes a cylindrical opening or center bore 3. This centerbore is preferably made in three diameters, successively increasing toward the top so that a shoulder 4 and a shoulder 5 will be formed intermediate the ends. The shoulder 4 constitutes the valve seat. An inclined opening 6 communicates with the lower extremity of the centerbore 3, and another inclined opening 7 on the other side of the valve body communicates with the centerbore above the valve seat. Surrounding the outlets of both openings 6 and 7 is an annular seat 8, each of which seats is concentric with the exit of one of the openings 6 or 7. The annular seats 8 are for the purpose of connecting with the couplings of the inlet and outlet pipes in any suitable manner, but preferably in the manner illustrated in my co-pending application Serial No. 188,614, filed Jan. 11, 1904.

The valve stem is provided with a flat face 9 and an enlarged portion 10 snugly fitting within the central opening between the shoulders 4 and 5. This enlarged portion 10 forms a guide and causes the face 9 to truly engage with the valve seat 4. Above the portion 10 the valve stem is of less diameter, and has a threaded portion 11 and an unthreaded portion 12. All portions of the valve stem are cylindrical, except the top 13, which is squared for the application of a turning wheel, arm or lever used for actuating the valve. The threaded portion of the valve stem engages with a nut 14, internally threaded. This nut is cylindrical and rests within the centerbore upon the shoulder 5. This nut is prevented from turning by any suitable means, that illustrated consisting of a bolt passing through an opening in the side of the valve body and having a reduced end 16 engaging with an opening 17 formed in the nut 14. A washer 18, preferably of lead, or other soft metal, prevents leakage around the body of the bolt 15. The nut 14 constitutes a fixed support for the valve stem and acts as if the threads formed within it were formed directly upon the valve body. Above the nut 14 and within the centerbore of the body and surrounding the stem 12 is a suitable packing 19. As shown in the drawings this packing consists of a number of rings or washers of an elastic material, but any other form of packing may be used. Above the packing 19 is a gland 20 having a cylindrical depending portion and a flange of larger size extending above the upper end of the centerbore. Surrounding the valve stem and engaging with the top of the gland is a cover 21 internally threaded and adapted to engage with the threaded neck 2. The periphery of the cover is shown as formed of hexagonal shape for the application of a wrench. The cover 21 holds the gland in position and compresses the packing 19 which serves the double purpose of preventing leakage around the stem 12 and around the outside of the nut 14 and gland 20, and also serves to hold the nut 14 upon its seat in addition of the holding action of the bolt 15.

The valve may be readily ground by first removing the nut 14 and packing 19, the gland 20 and cover 21 remaining in position. The gland and cover serve as a guide and support for the upper portion of the valve stem and by means of which it is truly held in position during the grinding operation. After the valve is ground it may be reassembled by returning the nut 14 and packing 19 to place. If desired the valve may be ground by omitting either the cover 21 or the gland 20, if it is found that the stem is securely held in position by one or the other.

A great advantage of the valve lies in the fact that the body is formed of stock cut to shape, in lieu of a casting which is objectionable in having flaws and blow holes, and a drop forging which is costly, and requires nearly as expensive finishing as does my valve body. It is to be noted that the tool work on the valve, aside from the forming of the neck, is the drilling of the centerbore, and the forming of the entrance and exit passages and the annular seats surrounding the same. This all tends to cheap work, and the result is a satisfactory valve, especially applicable to ammonia compression refrigerating apparatus. It is to be also noted that the packing rings do not necessarily hold the nut 14 in position, as the bolt 15 may be relied upon to solely do this. A feature which I regard of great importance is the removability of the nut 14, coupled with the steadying means for the stem. In the embodiment illustrated the gland 20, and the cover 21, either used alone or combined together.

Having now described my invention what I claim as new and desire to secure by Letters Patent is:

1. A valve having a body with a centerbore and a threaded neck, the said centerbore being formed with a valve seat and a shoulder above the valve seat, in combination with a valve stem, having a threaded portion, a nut engaging with the shoulder within the centerbore the threaded portion of the valve stem also engaging with the nut, a gland, and a cover engaging with the threaded neck for holding the gland within the centerbore.

2. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, and a cover engaging with the threaded neck for holding the gland within the centerbore.

3. A valve having a body with a centerbore and a threaded neck, the said centerbore being formed with a valve seat and a shoulder above the valve seat, in combination with a valve stem, having a threaded portion, a nut engaging with the shoulder within the centerbore and with the threaded portion of the stem, a gland, packing between the nut and gland, and a cover engaging with the threaded neck for holding the gland within the centerbore.

4. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, packing between the nut and gland, and a cover engaging with the threaded neck for holding the gland within the centerbore.

5. A valve having a body with a centerbore and a threaded neck, the said centerbore being formed with a valve seat and a shoulder above the valve seat, in combination with a valve stem, having a threaded portion, a nut engaging with the shoulder within the centerbore and with the threaded portion of the stem, a gland, a cover engaging with the threaded neck for holding the gland within the centerbore, and a bolt passing through the side of the body, and engaging with the nut to prevent it from turning.

6. A valve having a body with a centerbore and a threaded neck, the said centerbore being formed with a valve seat and a shoulder above the valve seat, in combination with a valve stem, having a threaded portion, a nut engaging with the shoulder within the centerbore and with the threaded portion of the stem, a gland, a cover engaging with the threaded neck for holding the gland within the centerbore, and a bolt passing through the side of the body, and engaging with the nut to prevent it from turning, and a washer under the head of the bolt for preventing leakage.

7. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, a cover engaging with the threaded neck for holding the gland within the centerbore, and a bolt passing through the side of the body, and engaging with the nut to prevent it from turning.

8. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, a cover engaging with the threaded neck for holding the gland within the centerbore, and a bolt passing through the side of the body, and engaging with the nut to prevent it from turning, and a washer under the head of the bolt for preventing leakage.

9. A valve having a body with a centerbore and a threaded neck, the said centerbore being formed with a valve seat and a shoulder above the valve seat, in combination with a valve stem, having a threaded portion, a nut engaging with the shoulder within the centerbore and with the threaded portion of the stem, a gland, packing between the nut and gland, a cover engaging with the threaded neck for holding the gland within the centerbore, and a bolt passing through the side of the body, and engaging with the nut to prevent it from turning.

10. A valve having a body with a centerbore and a threaded neck, the said centerbore being formed with a valve seat and a shoulder above the valve seat, in combination with a valve stem, having a threaded portion, a nut engaging with the shoulder within the centerbore and with the threaded portion of the stem, a gland, packing between the nut and gland, a cover engaging with the threaded neck for holding the gland within the centerbore, and a bolt passing through the side of the body, and engaging with the nut to prevent it from turning, and a washer under the head of the bolt for preventing leakage.

11. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, packing between the nut and gland, a cover engaging with the threaded neck for holding the gland within the centerbore, and a bolt passing through the side of the body, and engaging with the nut to prevent it from turning.

12. A valve having a body with a centerbore and a threaded neck, the said centerbore being formed with a valve seat and a shoulder above the valve seat, in combination with a valve stem, having an enlarged portion engaging with the centerbore, and a smaller threaded portion, a nut engaging with the shoulder within the centerbore and with the threaded portion of the stem, a gland, packing between the nut and gland, a cover engaging with the threaded neck for holding the gland within the centerbore, and a bolt passing through the side of the body, and engaging with the nut to prevent it from turning, and a washer under the head of the bolt for preventing leakage.

This specification signed and witnessed this 26th day of Dec., 1905.

RICHARD WHITAKER.

Witnesses:
H. MORELY HOLTON,
FRANK E. FISHER.